United States Patent

[11] 3,597,108

[72] Inventors John E. Mercer
 417 A. Butler Ave.;
 Thomas E. Sweeney, 61 Overbrook Drive;
 S.A. Weissenburger, Mount Lucas Road, all
 of Princeton, N.J. 08540
[21] Appl. No. 828,576
[22] Filed May 28, 1969
[45] Patented Aug. 3, 1971

[54] ROTARY SEMIRIGID AIRFOIL
 13 Claims, 5 Drawing Figs.
[52] U.S. Cl. .................................................... 416/139,
 416/240
[51] Int. Cl. ..................................................... B64c 11/26
[50] Field of Search ........................................... 416/139,
 132, 240, 51, 147

[56] References Cited
UNITED STATES PATENTS

| | | | |
|---|---|---|---|
| 704,507 | 7/1902 | Bruneau................. | 416/132 |
| 954,992 | 4/1910 | Von Parseval............ | 416/132 |
| 1,516,472 | 11/1924 | Beaty...................... | 416/132 |
| 3,188,020 | 6/1965 | Nielsen et al............ | 416/132 X |
| 3,321,022 | 5/1967 | Oguri..................... | 416/420 X |

Primary Examiner—Everette A. Powell, Jr.
Attorney—Darby & Darby

ABSTRACT: A semirigid airfoil for use with rotary wing airborne vehicles. The airfoil includes a rigid spar defining a leading edge, a cable defining the trailing edge and having a root end thereof secured to a root truss and an opposite end thereof secured to a tip truss. Flexible material forms top and bottom airfoil surfaces. Means are provided for controlling the tension in the trailing edge cable during rotation of the airfoil.

Patented Aug. 3, 1971
3,597,108
2 Sheets-Sheet 1
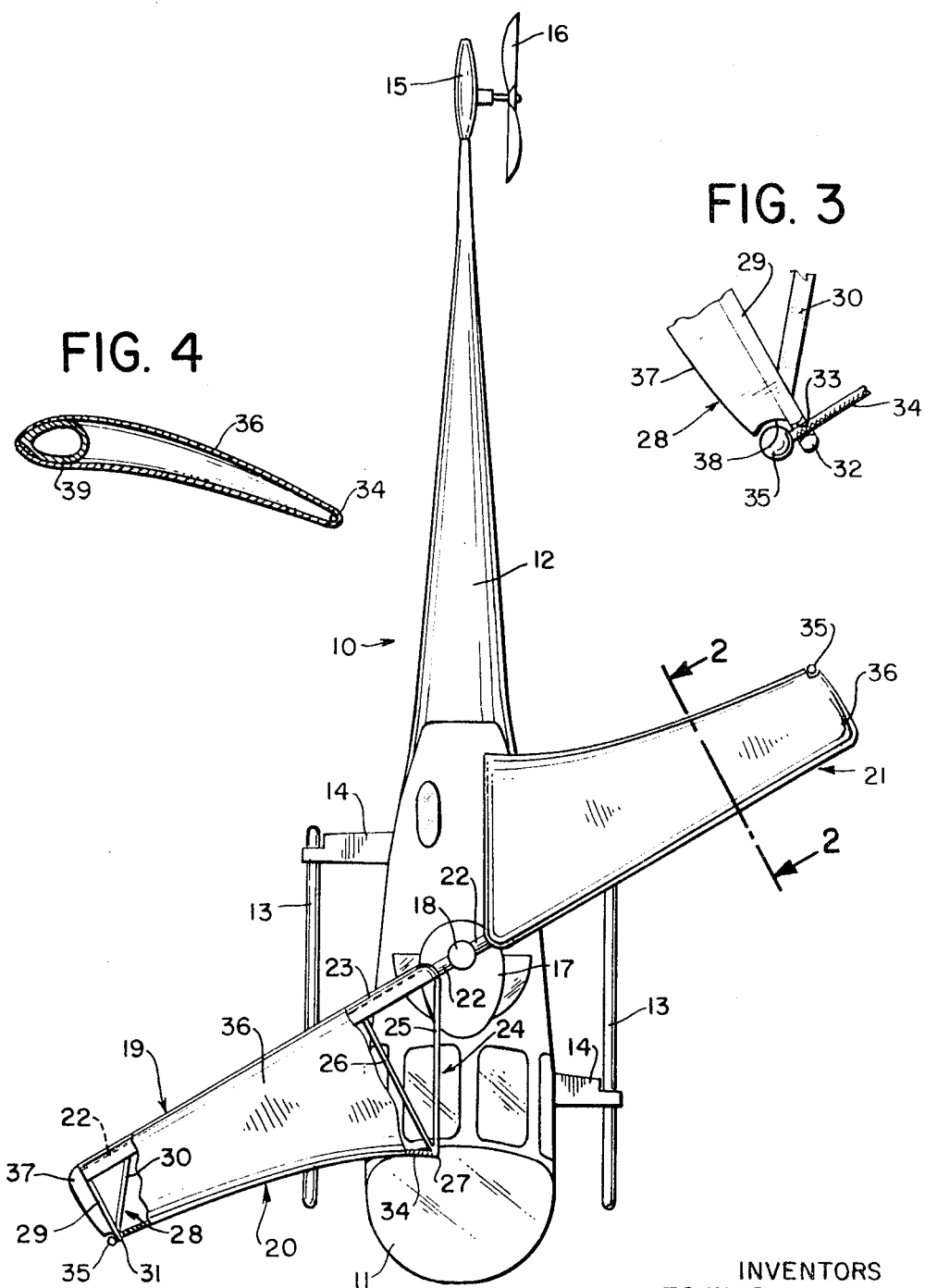
INVENTORS
JOHN E. MERCER
THOMAS E. SWEENEY
S. A. WEISSENBURGER
BY Darby & Darby
ATTORNEYS Patented Aug. 3, 1971 3,597,108

INVENTORS
JOHN E. MERCER
THOMAS E. SWEENEY
S. A. WEISSENBURGER

BY Darby & Darby
ATTORNEYS

ROTARY SEMIRIGID AIRFOIL

This invention relates to semirigid airfoils, or sail wings, and more particularly to apparatus for controlling the tension in the trailing edge of a rotary semirigid airfoil or sail wing.

The use of airfoils of semirigid construction in which a rigid spar supports a flexible wing form dates back to the early days of flight. Novel improvements in such structures, including arrangements for warping and/or folding semirigid airfoils and for bridling semirigid airfoils, are disclosed in copending applications for U.S. Letters Patent entitled Semi-Rigid Airfoil for Airborne Vehicles, Ser. No. 740,895, filed June 28, 1968, and Airfoil Bridle Apparatus, Ser. No. 741,826, filed June 26, 1968.

In airfoils supported from airborne vehicles of the spar and trailing edge cable type forming a semirigid construction, wherein a flexible material defines its aerodynamic form, an increase in the camber or curvature of the mean line of the airfoil leading edge to trailing edge is experienced at relatively high speeds. This wing camber results from lower air pressure on the upper surface of the flexible material than on the lower surface, due to the classical Bernoulli effects. This increase in airfoil camber will result in increases in lift which, in turn, result in increases in drag.

In addition to the cambering of the airfoil at relatively high speeds, the trailing edge cable is deflected both upwardly and forwardly due to aerodynamic loading on the wing, yielding changes in the span angle of attack distribution at varying wing speeds. A result of this tendency of the trailing edge cable to be deflected from its initial unloaded position is an increase in tension in the trailing edge cable between its normally fixed points of securement on the wing structure. This increased tension in the trailing edge cable results in a pulling of the points of securement of the trailing edge cable toward one another, with resulting bending stresses being induced in the leading edge spar and its associated structural members.

In order to compensate for these induced bending stresses resulting from bending moments created in the wing structure, added weight is necessary in order to increase the moment of inertia of the structural members being stressed in the direction of their deflection as induced by increases in trailing edge cable tension. This added weight is undesirable from a standpoint of aircraft handling as well as reduced load-carrying capabilities.

It is an object of the present invention to provide a semirigid airfoil of the sail wing type for use in rotary wing aircraft which includes means for varying tension in the trailing edge cable as a function of rotary speed.

Another object of the present invention is to provide a semirigid airfoil of the sail wing type which is lighter and less expensive to manufacture than known airfoils.

A further object of the present invention is to provide a semirigid airfoil of the sail wing type for use as both a means of extracting energy from wind and as a means of adding energy to the air.

Yet another object is to provide means for controlling the curvature of a rotary semirigid airfoil as a function of its rotational speed. The present invention fulfills the aforementioned objects and overcomes limitations and disadvantages of prior art solutions to existing problems by providing a flexible semirigid airfoil of the sail wing type which, in a preferred embodiment, includes a rigid spar and leading edge fairing which define the leading edge of the sail wing. A cable extending between a root point and a rearward tip point of the airfoil defines the trailing edge of the sail wing. Flexible material, which engages both the rigid spar and leading edge fairing as well as the trailing edge cable, forms top and bottom airfoil surfaces of the sail wing. A weight member secured to the extremity of the trailing edge cable provides means for increasing trailing edge cable tension during rotation of the sail wing due to centrifugal forces acting upon the weight member.

In embodiments of the present invention wherein the semirigid airfoil or sail wing is useful as means of propelling a vehicle through or of sustaining a vehicle in the air, the sail wing is secured to or integral with a powered rotor such as the type used in helicopter rotors or aircraft propellers.

The invention will be more clearly understood from the following description of specific embodiments of the invention together with the accompanying drawings, wherein similar reference characters denote similar elements throughout the several views, and in which:

FIG. 1 is a partly broken plan view of a helicopter utilizing sail wing structures as rotor blades according to the present invention;

FIG. 3 is an enlarged fragmentary view of a portion of a tip truss and trailing edge cable structure shown in FIG. 1;

FIG. 4 is a sectional elevational view similar to FIG. 2 showing an embodiment of a sail wing assembly wherein a rigid spar itself defines the leading edge of the sail wing;

Figure 5:
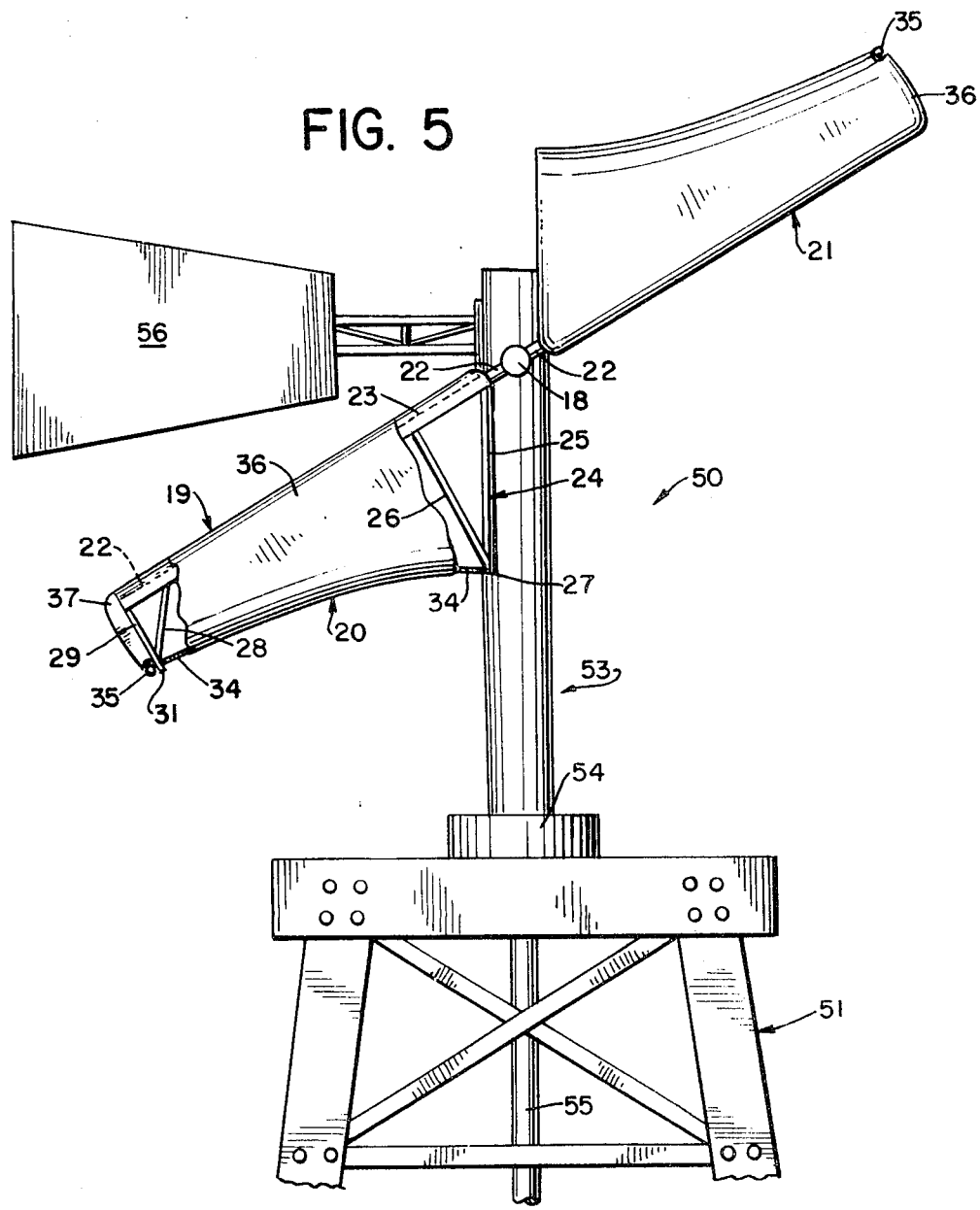
FIG. 5 is a fragmentary elevational view of a windmill utilizing a sail wing structure according to the present invention.

Referring now in detail to the drawing, FIG. 1 shows a semirigid flexible airfoil of the sail wing type being utilized as a rotor blade of a helicopter, for purposes of illustration.

A helicopter 10 includes a forward body 11 integrally mounted on a rearwardly extending fuselage 12. Helicopter 10 is provided with skids 13 supported beneath body 11 by suitable framework 14. A tail boom 15 with its associated tail rotor 16 is secured to the rearwardmost part of fuselage 12.

An engine 17 of any conventional piston and cylinder type, for example, is supported upon body 11. A rotor shaft or mast 18 powered by engine 17 extends upwardly from the engine and serves as the means by which power is delivered from engine 17 to main rotor assembly 19.

Rotary assembly 19 includes two opposing semirigid airfoils or sail wing assemblies 20 and 21 which constitute the effective main rotor blades of helicopter 10. Sail wing assemblies 20 and 21 each include a rigid tubular spar 22 (FIG. 2) which extends radially from and is connected to rotor shaft 18 or its hub (not shown). The hub is used where collective and cyclic pitch control are used. These are not discussed in detail here since they form no part of the present invention.

Rigid tubular spar 22 may be either fixably secured to rotor shaft or mast 18 or may be secured to a suitable pitching mechanism (not shown) forming part of the shaft 18. Such a pitching mechanism will enable the pilot of the aircraft to rotate spars 22, thereby pitching sail wing assemblies 20 and 21. A drooped leading edge fairing 23 is preferably secured, such as by welding, to the forward side of spar 22. A root truss assembly 24 (FIG. 1) is secured, such as by welding, to the rearward side of the root end of a tubular spar 22, and comprises truss members 25 and 26 welded together in a triangular shape. Any suitable polygonal configuration for the truss 24 is within the scope of the present invention. Truss members 25 and 26 converge at a truss tip portion 27 near the point of connection of the spar to the rotor shaft 18.

An airfoil tip truss assembly 28 (FIG. 1) is secured, such as by welding in a manner similar to root truss assembly 24, to the rearward side of spar 22 at a point spaced from the point of attachment of root truss assembly 24 to spar 22. Airfoil tip truss assembly 28 is formed by truss members 29 and 30, which converge at a tip portion 31. Tip portion 31, as shown in FIG. 3, includes a further extension or projection 32 of truss member 29 from its point of convergence with truss member 30, this extension being formed with an aperture or opening 33 through which a trailing edge cable 34 extends. Trailing edge cable 34, which defines the trailing edge of airfoil or sail wing assembly 20, is secured to root truss assembly tip portion 27 and extends between tip portions 27 and 31 in a predetermined catenary or curve. A weight member 35, preferably of a spherical shape and formed of lead, is secured to a remote end of cable 34. Weight 35 is normally located adjacent opening 33 and against extension 32 as a result of a preloaded tension in trailing edge cable 34. A wingtip fairing 37 is secured along one of the edges of truss member 29 and remains integral therewith. Fairing 37 is formed with a cutout 38 which serves as a relief space for weight 35.

Figure 2:
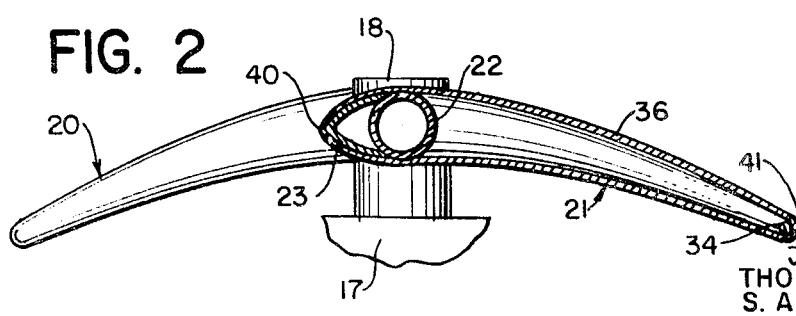
FIG. 2 is a fragmentary sectional elevational view looking along the line 2–2 of FIG. 1.

As shown best in FIG. 2, a piece of flexible material 36 extends from a first edge 40 thereof forwardly around spar 22 and leading edge fairing 23 without attachment thereto and back to its first edge where it is seamed to itself at 41. The seam 41 engages the trailing edge cable 34, thereby extending in a catenary arc substantially identical with that defined by trailing edge cable 34. The seam of the flexible material may be secured to trailing edge cable 34, such as by providing eyelets or lacing (not shown) secured to the seam through which cable 34 is passed. Material 36 is preferably made of Dacron sailcloth impregnated with silicon, but may also be canvas, plastic or other suitable flexible material. It is material 36 which defines the shape or form of airfoil assemblies 20 and 21.

The tension in flexible wing material 36 is controlled by varying the tension in cable 34, as will be described in more detail below.

In operation, engine 17 of helicopter 10 imparts rotary movement to rotor shaft 18 and thus to spars 22 which are secured to shaft 18. Main rotor assembly 19 is thereby caused to rotate, aerodynamically loading semirigid airfoil or sail wing assemblies 20 and 21. This aerodynamic loading of sail wings 20 and 21 results in a cambering thereof and an increasing of tension within flexible material 36, which is shown in FIG. 2 defining the form of sail wings 20 and 21. Simultaneously, however, weight member 35 is subjected to the centrifugal forces associated with the rotation of main rotor assembly 19. It is these centrifugal forces which urge weight 35 in a direction away from shaft 18, thereby increasing tension in the trailing edge cable 34. Thus, with increased speeds of rotation, increases in aerodynamic loading of the sail wings as well as increases in trailing edge cable tension are experienced.

The result of these increases in the aerodynamic loading of the sail wings as well as the increases in trailing edge cable tension is the creation of an aerodynamic airfoil which experiences increased wing efficiencies due to higher values of L/D (lift/drag) ratios for given airfoil structures. Undesirable nonuniform decreases in the lift to drag (L/D) ratio, which affect the airfoil lift pattern, are eliminated. In addition, bending moments in rigid spar 22, which would be induced by the transmittal of tension forces in the trailing edge cable to opposite ends of the spar, are avoided with tip truss assembly 28 since there is no structural interconnection between cable 34 and the truss assembly through which such forces could be transferred.

FIG. 4 illustrates an alternative embodiment of the present invention wherein the drooped leading edge fairing is eliminated, the forward edge of a rigid spar 39 defining the leading edge of airfoil assemblies 20 and 21. In this embodiment, material 36 is wrapped around the forward portions of spar 39 as well as the cable 34, thereby forming an envelope having superior airfoil characteristics. An advantage of utilizing the envelope airfoil construction of FIG. 4 resides in the cable's tendency to maintain material 36 in a relatively taut condition during operation, thereby reducing drag.

FIG. 5 illustrates the use of a semirigid airfoil of the sail wing type, according to this invention, as means for extracting energy from wind as a windmill vane. Windmill 50 is fragmentarily shown including a ground-supported structure 51 extending upwardly to a platform 52. A rotor assembly support assembly 53 is mounted for rotation upon platform 52. In a preferred embodiment of the structure shown in FIG. 5, a thrust bearing 54 enables relatively frictionless rotation of support assembly 53, as described below.

A main rotor assembly, substantially identical in all respects to main rotor assembly 19, and therefore designated by the same reference numeral, is rotatably supported by support assembly 53. A vertically extending shaft 55 is journaled in support assembly 53 and exhibits rotary movement in response to turning of main rotor assembly 19 due to wind forces. Shaft 53 is preferably geared directly to rotor shaft 18 by bevel gears, for example.

A directional vane 56 is secured to support assembly 53 and maintains the zone of revolution of main rotor assembly 19 substantially perpendicular to the direction of wind.

In operation, the main rotor assembly of windmill 50 turns in response to wind, thereby causing shaft 55 to turn and to deliver power to remote apparatus. The sail wing assemblies function in the manner already described for FIGS. 1—4.

In another embodiment of this invention not specifically illustrated, a signal responsive to the rotary speed of rotor shaft 18 is used to control tension in trailing edge cable 34, instead of using a weight such as weight 35. In this form, a tachometer is used to sense shaft speed, and electrical circuitry supplies the means by which the signal changes the cable tension. The embodiments shown in FIGS. 1—5 are preferred.

The embodiments of the invention particularly disclosed are presented merely as examples of the invention. Other embodiments, forms and modifications of the invention coming within the proper scope of the appended claims will of course readily suggest themselves to those skilled in the art.

What we claim is:

1. In combination: an airfoil assembly comprising at least one semirigid airfoil including a rigid leading edge portion, a cable defining a trailing edge portion, flexible material engaging said leading edge portion and the cable for defining portions of the form of the airfoil, said material having two layers which are spaced from one another in the area between the leading and trailing edges of the airfoil; rotatable means; and means for connecting said airfoil assembly to said rotatable means for rotation therewith.

2. The combination of claim 1 wherein said rotatable means are power driven to rotate the airfoil assembly.

3. The combination of claim 1 wherein said rotatable means are driven by force acting upon said airfoil assembly.

4. The combination of claim 1 further comprising means connected to said trailing edge portion of said airfoil assembly for varying the tension in said trailing edge cable.

5. The combination according to claim 4 wherein said leading edge of said semirigid airfoil includes a rigid spar extending substantially parallel with said leading edge portion, a root truss assembly integral with a root portion of said spar, and a tip truss assembly integral with a tip portion of said spar, said cable being secured to said root truss assembly and extending to said tip truss assembly.

6. The combination according to claim 5 wherein said tension-varying means includes a weight member connected to said cable, the magnitude of the tension being a function of the speed of rotation of said semirigid airfoil.

7. The combination according to claim 1 wherein said leading edge of said semirigid airfoil includes a rigid spar extending substantially parallel with said leading edge portion, a root truss assembly integral with a root portion of said spar, and a tip truss assembly integral with a tip portion of said spar, said cable being secured to said root truss assembly and extending to said tip truss assembly.

8. The combination according to claim 4 wherein said varying means includes a weight member connected to said cable, the magnitude of the tension being a function of the speed of rotation of said semirigid airfoil.

9. The combination according to claim 7 wherein said airfoil assembly comprises a pair of said semirigid airfoils, said rotatable means comprises a powered shaft, said spars of said airfoils extending from and being connected to said shaft.

10. The combination according to claim 6 wherein said tip truss assembly is formed with an opening through which said cable extends from said root truss assembly, said weight member disposed adjacent said opening when said airfoil is stationary.

11. The combination of claim 4 for use with a rotary wing aircraft further comprising a body having an engine mounted thereon, said rotatable means comprises a rotor shaft connected between said engine and said airfoil assembly for rotating said airfoil assembly.

12. The combination of claim 1 wherein said rotatable means comprises a shaft, said airfoil assembly being connected to said shaft and being exposed to the wind to be powered by the wind to rotate said shaft.

13. The combination according to claim 12 wherein said apparatus includes a windmill, or the like, said apparatus further comprising means for maintaining said semirigid airfoil assembly in a predetermined position with respect to the direction of wind.